United States Patent
Takeda

(10) Patent No.: US 6,458,464 B1
(45) Date of Patent: Oct. 1, 2002

(54) DECORATIVE SHEET

(75) Inventor: Yasuyuki Takeda, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/600,223

(22) PCT Filed: Dec. 28, 1998

(86) PCT No.: PCT/US98/27691
§ 371 (c)(1),
(2), (4) Date: Jul. 2, 2000

(87) PCT Pub. No.: WO98/38901
PCT Pub. Date: Aug. 5, 1999

(51) Int. Cl.$^7$ .................................................. B32B 9/04
(52) U.S. Cl. .......................................... 428/457; 428/461
(58) Field of Search ................................ 428/263, 310, 428/316, 421, 457, 461, 460

(56) References Cited

U.S. PATENT DOCUMENTS

| | | | |
|---|---|---|---|
| 3,915,779 A | * 10/1975 | Yoshikawa et al. | 156/229 |
| 4,068,034 A | * 1/1978 | Segawa et al. | 428/263 |
| 4,291,154 A | 9/1981 | Blount | 528/335 |
| 4,508,889 A | 4/1985 | Noren et al. | 528/28 |
| 4,810,320 A | * 3/1989 | Inagaki | 156/233 |
| 5,130,461 A | 7/1992 | Shinohara et al. | 556/449 |

FOREIGN PATENT DOCUMENTS

| | | | |
|---|---|---|---|
| EP | 0354472 | * 2/1990 | |
| EP | 0 459 720 | 12/1991 | B32B/27/08 |
| JP | 01-174584 | 7/1989 | C09J/7/02 |
| JP | 05-097868 | 4/1993 | C07F/7/08 |
| JP | 05-271642 | 10/1993 | |
| JP | 07-112521 | 5/1995 | B32B/33/00 |

\* cited by examiner

*Primary Examiner*—Merrick Dixon
(74) *Attorney, Agent, or Firm*—James D. Christoff

(57) ABSTRACT

A decorative sheet (10) comprising: (a) a light-transmitting covering film (12) which comprises a vinyl chloride resin; (b) a light-transmitting bonding composite layer (14) which is adhered to the back of said covering film and (c) a metal layer (16) which is adhered to the back of said bonding composite layer, wherein said bonding composite layer comprises the first resin layer (18) adhered to said covering film, and the second resin layer (20) adhered to said metal layer (16), said first resin layer (18) comprises a saturated polyester or a aminoethylated resin, and said second resin layer (20) comprises (i) a polyester having a siloxane bond in a molecule or (ii) a polyurethane resin having a siloxane bond in a molecule and a polyester unit.

20 Claims, 1 Drawing Sheet

DECORATIVE SHEET

FIELD OF THE INVENTION

The present invention relates to a decorative sheet having a metalescent appearance and a metal layer which is included inside the sheet and observed through a light-transmitting covering film.

BACKGROUND OF THE INVENTION

Decorative sheets are known, which comprise a covering film layer containing a flexible resin and a metal layer provided on the back of the covering film layer and has a metalescent appearance, and in which the metal layer can be observed through the covering film.

One of the characteristics of such decorative sheets is that a resin layer in direct contact with the metal layer comprises a resin having relatively high heat resistance and good adhesion to the metal layer to prevent clouding (whitening) of the metal layer under high temperature conditions.

For example, Japanese Patent Publication JP-A-1-174584 discloses a decorative sheet comprising a laminate film including a vinyl fluoride resin and a covering layer which has good printing properties, and a metal deposition layer adhered to the vinyl fluoride resin side. This decorative sheet uses the vinyl fluoride resin having high heat resistance and good adhesion to the metal layer as a bonding layer between the covering layer and metal layer to adhere these layers. Thus, the clouding of the metal layer is prevented. However, the kinds of the resins for the covering layer is limited, since those having good adhesion to the vinyl fluoride resin should be used. A vinyl chloride resin is exemplified as a resin for the covering layer, but the above patent application does not disclose how to adhere the vinyl chloride resin and vinyl fluoride resin.

U.S. Pat. No. 5,164,245 (Suzuki) discloses a decorative sheet which uses, as a covering film, a laminated film comprising a polymer alloy layer of polyvinylidene fluoride (PVDF) and polymethyl methacrylate (PMMA). That is, the decorative sheet disclosed uses a film comprising a PMMA-rich first alloy layer as the outermost layer, and a PVDF-rich second alloy layer which is adhered to the metal layer. It may be possible to use the above covering film as a bonding layer, and a vinyl chloride film as the outermost covering film, since the first alloy layer has relatively good adhesion to flexible resins such as the vinyl chloride resin.

However, extruded films or co-extruded films are usually used, since the above fluororesins are dissolved into solvents with difficulty. In such a case, the films have low smoothness. Thus, embossing or other heat treatment is necessary to achieve the high mirror smoothness, but such treatment may flaw the surface of the film. Furthermore, the fluororesins are expensive. Flaws on the bonding layer deteriorate the appearance, since the metal layer is observed through both the covering film and bonding layer.

Japanese Patent Publication JP-A-7-112521 discloses a decorative sheet comprising a bonding layer made of an urethane resin having a siloxane bond in the molecule. The urethane resin has very good effects on the prevention of the above clouding of the metal layer, and can be filmed by coating. Thus, the urethane resin layer is less flawed during the production process than the fluororesins. In addition, the urethane resin is less expansive than the fluororesins. However, this publication does not concretely describe how to adhere the bonding layer and covering film, when the vinyl chloride resin film is used as the covering film.

SUMMARY OF THE INVENTION

It has been found that the adhesion between the vinyl chloride resin and the above urethane resin as disclosed in Japanese Patent Publication JP-A-7-112521 is low. Thus, a need exists in the art to find a decorative film that is flexible and can have a patterned metallic layer.

Vinyl chloride resin film is very useful as the covering film of the decorative sheet, since (1) it satisfies the required properties for the decorative sheet, such as weather resistance, (2) a variety of satisfactorily used pigments can be used for coloring the film, and (3) the price of the decorative sheet can be reduced.

Thus, one aspect of the present invention is a decorative sheet which comprises a vinyl chloride resin film as a covering film, and prevents clouding (whitening) of a metal layer under high temperature conditions.

The present invention provides a decorative sheet comprising:

(a) a light-transmitting covering film which comprises a vinyl chloride resin, (b) a light-transmitting bonding composite layer which is adhered to the back of said covering film, and (c) a metal layer which is adhered to the back of said bonding composite layer, wherein said bonding composite layer comprises the first resin layer adhered to said covering film, and the second resin layer adhered to said metal layer, said first resin layer comprises a saturated polyester or an aminoethylated resin, and said second resin layer comprises (i) a polyester having a siloxane bond in a molecule or (ii) a polyurethane resin having a siloxane bond in a molecule and a polyester unit.

The present invention can effectively improve the clouding of the metal layer and the adhesion of the metal layer to the covering layer, since the bonding composite layer, which adheres the metal layer and covering film comprising the vinyl chloride resin, has the above structure.

Herein, the "vinyl chloride resin" includes a homopolymer of vinyl chloride, and copolymers comprising vinyl chloride units.

The first resin layer of the bonding composite layer comprises a saturated polyester or an aminoethylated resin, and thus has good adhesion to the covering film comprising the vinyl chloride resin.

The second resin layer of the bonding composite layer comprises (i) a polyester having a slioxane bond in a molecule or (ii) a polyurethane resin having a siloxane bond in a molecule and a polyester unit, and thus prevents the clouding (whitening) of the metal layer under the high temperature conditions. Furthermore, the adhesion of the second resin layer to the first resin layer increases.

According to the present invention, a film comprising a vinyl chloride resin can be used as a covering film, and a decorative sheet is provided, which does not suffer from peeling off at any interface of the covering film, bonding composite layer and metal layer, and prevents the clouding of the metal layer during the use (even under the high temperature conditions). The first and second resin layers of the bonding composite layer are preferably formed by a coating method to effectively increase the adhesion between these resin layers.

Further features and advantages of the invention will be described in respect of embodiments described with reference to the following drawing.

EMBODIMENTS OF THE INVENTION

Figure 1:
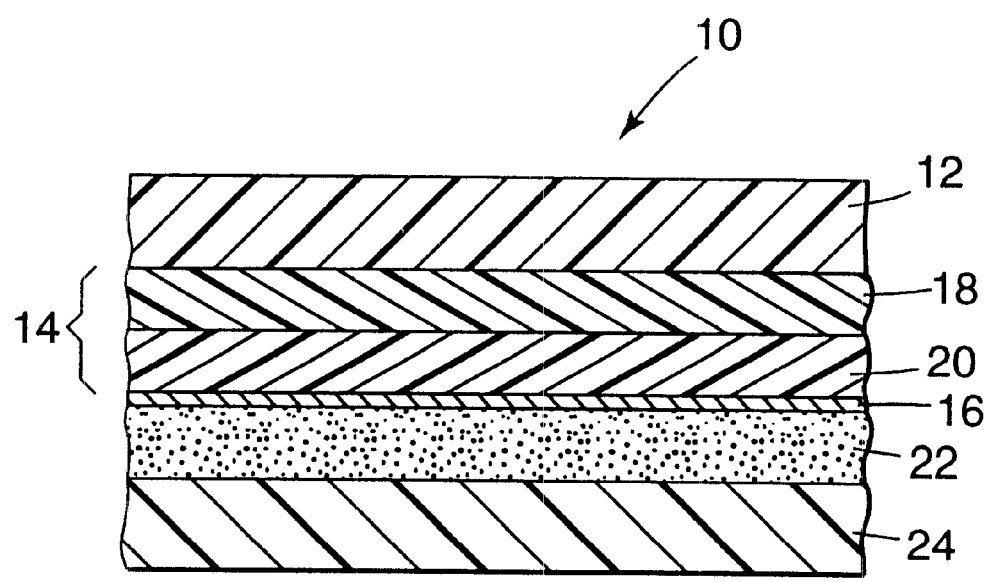
FIG. 1 is a cross-sectional view of a composite sheet of the present invention.

FIG. 1 shows a cross-section of decorative sheet 10 having three layers: a light-transmitting covering film 12, a light-transmitting bonding composite layer generally 14, and a metallic layer 16. The bonding composite layer 14 comprises a first resin layer 18 and a second layer 20.

Bonding Composite Layer

First Layer

The first layer 18 of the bonding composite layer 14 comprises saturated polyester or an aminoethylated resin, and serves not only as the adhesive layer for adhering the second layer 20 of the bonding composite layer 14 and covering film 12, but also as a barrier layer for preventing the migration of components of the vinyl chloride resin such as plasticizers and various stabilizers to the interface between the second layer 20 and metal layer 16.

In the decorative sheet 10 of the present invention, the covering film 12 and bonding composite layer 14 are required to be light-transmitting, since the metal layer 16 is observed though both the covering film 12 and bonding composite layer 14. Thus, the light transmission of the first layer 18 is usually at least 40%, preferably at least 60%, more preferably at least 70%.

Herein, the "light transmission" means a light transmission measured with a UV/visible light spectrometer 'U best V-560" manufactured by Nippon Bunko Co., Ltd. using light of 550 nm.

As the first resin, saturated polyester resins, aminoethylated resins and mixtures thereof are preferably used. The saturated polyesters are preferably linear polyesters. In particular, those having $T_g$ of higher than 50° C. are preferable.

The saturated polyester resins can effectively improve the functions of the first layer 18 as the adhesive and barrier layers, when they are crosslinked with crosslinking agents such as isocyanate compounds. The amount of the crosslinking agents is usually between 1 and 20 wt. parts per 100 wt. parts of the resins.

Nonlimiting examples of the aminoethylated resins are POLYMENT NK360, NK-380 and NK-307, all manufactured by NIPPON CATALYST Co., Ltd. of Japan.

The molecular weight (weight average) of the resins for the first layer 18 is not limited insofar as the effects of the present invention are not impaired. The weight average molecular weight of the first resin is usually between 1000 and 1,000,000.

The thickness of the first layer 18 is usually between 0.5 and 15 μm, preferably between 1 and 10 μm. When the thickness of the first layer is too small, the barrier effect may deteriorate. When the thickness is too large, the adhesion between the covering film 12 and bonding composite layer 14 may be insufficient, and the flexibility of the whole sheet 10 tends to deteriorate.

The first layer 18 is preferably formed by coating methods. For coating, any known coater such as a knife coater, a roll coater, a die coater or a bar coater can be used.

When a coating liquid contains a solvent, drying is usually carried out at a temperature of between 60 and 180° C., for several seconds to several minutes.

Second Layer

The second layer 20 has good adhesion to the metal layer 16 and high heat resistance, and functions so that the metal layer in contact with the second layer is not clouded (whitened) under the high temperature conditions or in the case where the sheet is heated. When the second layer 20 is required to be light-transmitting like the first layer 18, the light transmission of the second layer 20 is usually at least 40%, preferably at least 60%, more preferably at least 70%.

The resins for the second layer 20 are preferably (i) a polyester having a siloxane bond in a molecule, (ii) a polyurethane resin having a siloxane bond in a molecule and a polyester unit, and (iii) a mixture thereof. The resins (i) and (ii) may be referred to as "silicon-modified polyester" and "silicone-modified polyurethane, respectively.

The molecular weight of the resin for the second layer 20 is not limited, insofar as the effects of the present invention are not impaired. The weight average molecular weight of this resin is usually between 1000 and 1,000,000.

These resins will be explained more in detail below.

The thickness of the second layer 20 is usually between 0.5 and 15 μm, preferably between 1 and 10 μm. When the thickness of the second layer 20 is too small, the effects for preventing clouding may decrease. When the thickness is too large, the flexibility of the whole sheet 10 tends to deteriorate.

The second layer 20 is also preferably formed by coating methods. For coating, the same coaters as used for forming the first layer 18 are used. The drying conditions are also the same as those for the first layer 18.

As further explanation of the resins comprising the second layer 20, the "siloxane bonds" mean —Si—O— units. The "polyester having a siloxane bond in a molecule" means a polyester formed from a polyol having at least one siloxane unit in a molecule.

The polyurethane resin having a siloxane bond in a molecule and a polyester unit" means a resin prepared by reacting the above polyol and an isocyanate compound.

When at least one siloxane bond is contained in the polymer chain of the resin, the clouding can be effectively prevented. When the number of the repeating units is too large, the reactivity of the resin tends to decrease and thus the heat resistance may not be effectively improved. The number of the repeating units of the siloxane bond is preferably between 2 and 1000, from such a point of view.

The polyols used for the preparation of the polyesters containing the siloxane bonds in the molecules may be prepared by the reaction of raw material polyols having a siloxane bond in a molecule and polybasic acids such as dicarboxylic acids. Alternatively, the polyols described in Japanese Patent Publication JP-A-5-97868 may be used. Such polyols are hose having a siloxane bond in a molecule and at least two hydroxyl groups at the molecular ends.

In addition, polysiloxanes having at least two alkoxyl groups which are easily hydrolyzed in the presence of water and are bonded to the silicon atoms may be used. Since such polyols have the siloxane bonds in the molecules, they can provide polyesters and polyurethanes having good heat resistance and oxidation resistance, and also good adhesion to the metal layer.

The above polyols may include other functional groups such as ester, ether, carboxyl, phenyl, methyl, ethyl, acryl or amino groups. In particular, polyols having benzene rings such as 1,3-bis(phydroxybenzyl)-1,1,3,3-tetramethyldisiloxane and their derivatives, as disclosed in U.S. Pat. No. 5,130,461 (Satoh et al.), have good heat resistance.

Examples of the isocyanates suitable for use in the preparation of the polyurethane are aromatic, araliphatic, aliphatic and alicyclic isocyanates, for example, diphenylmethane-4,4'-diisocyanate (MDI), tolyienediisocyanate (TDI), hexamethylenediisocyanate, isophoronediisocyanate, hthylenediisocyanate dicyclohexylmethane-4,4'-diisacyanate, nap (NDI), and their terminal-blocked derivatives. The trimers of these isocyanates have good heat resistance, in particular, the trimers of isophoronediisocyanate (IPDI), hexamethyienediisocyanate (HDI), and the like are preferable, since they have good heat resistance, and can form polyurethanes which are not yellowed. The trimers of the isocyanates can be used also as crosslinking agents. When the above polyester or polyurethane resins are crosslinked, the amount of a crosslinking agent is usually between 1 and 100 wt. parts per 100 wt. parts of the resins.

The coating compositions for the first and/or second layers may contain various additives, insofar as the effects of the present invention are not impaired. Examples of the additives are plasticizers, tackifiers, viscosity modifiers, anti-foaming agents, leveling agents, UV light absorbers, antioxidants, pigments, antifungus agents, and the like.

Covering Film

The covering film 12 is a film formed from a material containing a vinyl chloride resin. The shaping methods include film-forming methods such as calendering, casting, extrusion, and the like. For example, a coating liquid containing the vinyl chloride resin, such as a sol, is applied on a process substrate and dried to form a film. The process substrate may be a plastic film having a releasing surface, such as a polyethylene terephthalate (PET) film.

When the colorless transparent film (usually having a light transmission of at least 70%) is used as the vinyl chloride resin film, metalescent appearance with silver tone is obtained. When the light-transmitting colored film (usually having a light transmission of at least 40%) is used, metallic appearance having any color can be obtained. The surface of the covering film 12 can be embossed or printed.

The thickness of the covering film 12 is not limited, and is usually between 10 and 300 $\mu$m, preferably between 20 and 100 $\mu$m.

Metal Layer

The metal layer 16 can be any metal such as aluminum, tin, chromium, and the like. The thickness of the metal layer is usually between 50 and 5000 Å in view of the mechanical strength.

Optional Adhesive Layer

An adhesive layer 22 may be laminated on the surface of the metal layer 16 to produce a decorative sheet having an adhesive layer. The adhesive layer is a layer comprising an adhesive or a pressure sensitive adhesive. As the pressure-sensitive adhesive, acrylic, silicone, urethane or rubber base pressure-sensitive adhesives may be used. The pressure-sensitive adhesives may be uncrosslinked or crosslinked, insofar as the effects of the present invention are not impaired. The adhesive may contain tackifiers or elastic microspheres. The thickness of the adhesive layer is usually between 2 and 50 $\mu$m, preferably between 5 and 30 $\mu$m.

Method of Making a Decorative Sheet

The decorative sheet 10 may be produced as follows:

Firstly, the first layer 18 of the bonding composite layer 14 is laminated on the back of the covering film 12. The first layer 18 is formed, for example, by applying and solidifying a coating composition comprising any of the resins identified above. Solidification can be carried out by drying, curing, cooling (when the composition is a molten liquid), and the like. The composition may be applied by coating with a roll coater, a knife coater, a bar coater, a die coater, and the like, or by printing such as screen printing.

The second layer 20 is also formed by applying and solidifying a coating composition comprising the second resin in the same manner as for the formation of the first layer 18.

Next, the metal layer 16 is formed on the surface of the bonding composite layer 14, and the decorative sheet 10 of the present invention is finished.

The metal layer 16 may be formed by any thin film-forming methods such as vapor deposition, sputtering, etc.

The optional adhesive layer 22 may be laminated on the surface of the metal layer 16 to produce a decorative sheet 10 having an adhesive layer. The adhesive layer 22 may be formed by coating a coating composition containing the pressure sensitive adhesive on a release paper 24 (including a polymer liner) and solidifying it to form a laminate, and then laminating the laminate on the back of the metal layer. Alternatively, the coating composition may be applied directly on the metal layer, and solidified.

Further embodiments are found in the following examples.

EXAMPLES

Example 1

Firstly, a covering film having a thickness of 50 $\mu$m, which comprises a vinyl chloride film formed on the surface of a process substrate (PET), was provided. Next, a coating liquid containing a linear saturated polyester (BYRON 24 SS manufactured by TOYOBO) and a polyisocyanate crosslinking agent (COLONATE HX manufactured by NIPPON POLYURETHANE) in a weight ratio of 100:3 was coated on the covering film, and dried at 160° C. for 3 minutes to form the first layer having a thickness of 5 $\mu$m.

Then, another coating liquid containing a silicone-modified polyester (BAYSILONE RESIN (trademark) UD-460 manufactured by BAYER SYNTHETIC SILICONE Co., Ltd.) and isophoronediisocyanate (Z4370 manufactured by SUMITOMO BAYER JAPAN Co., Ltd.) in a weight ratio of 100:75 (solid content of 20%) was coated on the first layer, and dried at 180° C. for 3 minutes to form the second layer having the thickness of 2 $\mu$m, and a bonding composite layer was formed.

Finally, an aluminum layer having a thickness of 500 Å was laminated on the second layer of the bonding composite layer by vacuum deposition, and the decorative sheet of this Example was obtained.

In this Example, a release paper having an adhesive layer, which had been prepared by coating an acrylic pressure-sensitive adhesive on a release paper, was laminated on the metal layer to form the decorative sheet with the adhesive layer.

The results of the evaluations of this decorative sheet are as follows:

(1) Adhesive Force of the Aluminum Layer

The aluminum layer had an adhesive force exceeding 1.5 kg/25 mm, after the decorative sheet was aged for 30 days under the heat cycling condition between −30° C. and 80° C. Furthermore, the aluminum layer had an adhesive force exceeding 1.5 kg/25 mm, even after the aging at 100° C. for 30 days. These results indicates that the adhesive force between the metal layer and bonding composite layer was good.

(2) Heat Resistance (Clouding Test)

The decorative sheet was adhered to an aluminum plate through the adhesive layer of the sheet. Then, the aluminum plate carrying the decorative sheet was heated in an oven at 160° C. for 30 minutes, and the appearance of the metal layer was observed. No clouding was found.

(3) Flexibility of the Sheet

The flexibility of the decorative sheet was examined by feeling. The decorative sheet of this Example had substantially the same flexibility as a vinyl chloride resin film having a thickness of 50 $\mu$m.

Example 2

A decorative sheet of this Example was prepared by the same method as in Example 1 except that an aminoethylated resin (NK350 manufactured by NIPPON CATALYST Go., Ltd.) was used as the resin for the first layer. The thickness of the first layer was 3 μm.

When this decorative sheet was subjected to the same evaluations as in Example 1 ((1) Adhesive force of aluminum layer, (2) Heat resistance (clouding text), and (3) Flexibility of the sheet), the decorative sheet of this example had substantially the same properties as those of the sheet of Example 1.

The invention is not limited to the above embodiments. The claims follow.

What is claimed is:

1. A decorative sheet comprising:
   (a) a light-transmitting covering film which comprises a vinyl chloride resin;
   (b) a light-transmitting bonding composite layer which is adhered to the back of said covering film; and
   (c) a metal layer which is adhered to the back of said bonding composite layer; wherein
      said bonding composite layer comprises the first resin layer adhered to said covering film, and a second resin layer adhered to said metal layer;
      said first resin layer comprises a saturated polyester, an aminoethylated resin, or a mixture thereof; and
      said second resin layer comprises (i) a polyester having a siloxane bond in a molecule, (ii) a polyurethane resin having a siloxane bond in a molecule and a polyester unit, or (iii) a mixture thereof.

2. The decorative sheet of claim 1, further comprising a layer of adhesive adhered to the metal layer.

3. The decorative sheet of claim 1, wherein the light transmission of the first resin layer is at least 40% and wherein the light transmission of the second resin layer is at least 40%.

4. The decorative sheet of claim 3, wherein the thickness of the first resin layer is 0.5 μm to 15 μm and wherein the thickness of the second resin layer ranges is 0.5 μm to 15 μm.

5. The decorative sheet of claim 1, wherein the first resin layer and the second resin layer further comprise additives selected from the group consisting of plasticizers, tackifiers, viscosity modifiers, anti-foaming agents, leveling agents, UV light absorbers, antioxidants, pigments, antifungus agents, and combinations thereof.

6. The decorative sheet of claim 1, wherein the first resin layer of the bonding composite layer comprises linear saturated polyesters having a glass transition temperature higher than 50° C.

7. The decorative sheet of claim 1, wherein the first resin layer of the bonding composite layer comprises at least one crosslinking agent and the second resin layer of the bonding composite layer comprises at least one crosslinking agent.

8. The decorative sheet of claim 7, wherein the crosslinking agent of the first resin layer of the bonding composite layer is present in an amount of 1 to 20 weight percent of the first resin layer, and the crosslinking agent of the second resin layer of the bonding composite layer is present in an amount of 1 to 100 weight percent of the second resin layer.

9. The decorative sheet of claim 7, wherein the crosslinking agents of the first resin layer and the crosslinking agents of the second resin layer are isocyanate compounds.

10. A decorative sheet comprising:
    (a) a light-transmitting embossable, printable covering film which comprises a vinyl chloride resin;
    (b) a light-transmitting bonding composite layer which is adhered to the back of said covering film; and
    (c) a metal layer which is adhered to the back of said bonding composite layer; wherein
       said bonding composite layer comprises a first resin layer adhered to said covering film, and a second resin layer adhered to said metal layer;
       said first resin layer comprises a saturated polyester resin, an aminoethylated resin, or a mixture thereof, wherein said resin has a weight average molecular weight of 1,000 to 1,000,000; and
       said second resin layer comprises (i) a polyester having a siloxane bond in a molecule, (ii) a polyurethane resin having a siloxane bond in a molecule and a polyester unit, or (iii) a mixture thereof, wherein said resin has a weight average molecular weight of 1,000 to 1,000,000.

11. The decorative sheet of claim 10, further comprising a layer of adhesive adhered to the metal layer.

12. The decorative sheet of claim 10, wherein the light transmission of the first resin layer of the bonding composite layer is at least 40% and wherein the light transmission of the second resin layer of the bonding composite layer is at least 40%.

13. The decorative sheet of claim 10, wherein the thickness of the first resin layer is 0.5 μm to 15 μm and wherein the thickness of the second resin layer is 0.5 μm to 15 μm.

14. The decorative sheet of claim 10, wherein the first resin layer and the second resin layer of the bonding composite layer further comprise additives selected from the group consisting of plasticizers, tackifiers, viscosity modifiers, anti-foaming agents, leveling agents, UV light absorbers, antioxidants, pigments, antifungus agents, and combinations thereof.

15. The decorative sheet of claim 10, wherein the first resin layer of the bonding composite layer comprises linear saturated polyesters having a glass transition temperature higher than 50° C.

16. The decorative sheet of claim 10, wherein the first resin layer of the bonding composite layer comprises at least one crosslinking agent and the second resin layer of the bonding composite layer comprises at least one crosslinking agent.

17. The decorative sheet of claim 2, wherein the light transmission of the first resin layer is at least 40% and wherein the light transmission of the second resin layer is at least 40%.

18. The decorative sheet of claim 2, wherein the first resin layer and the second resin layer further comprise additives selected from the group consisting of plasticizers, tackifiers, viscosity modifiers, anti-foaming agents, leveling agents, UV light absorbers, antioxidants, pigments, antifungus agents, and combinations thereof.

19. The decorative sheet of claim 3, wherein the first resin layer and the second resin layer further comprise additives selected from the group consisting of plasticizers, tackifiers, viscosity modifiers, anti-foaming agents, leveling agents, UV light absorbers, antioxidants, pigments, antifungus agents, and combinations thereof.

20. The decorative sheet of claim 4, wherein the first resin layer and the second resin layer further comprise additives selected from the group consisting of plasticizers, tackifiers, viscosity modifiers, anti-foaming agents, leveling agents, UV light absorbers, antioxidants, pigments, antifungus agents, and combinations thereof.

* * * * *